United States Patent [19]
Dworetzky

[11] 3,943,641
[45] Mar. 16, 1976

[54] AUDIENCE RESPONSE SYSTEM

[76] Inventor: John Peter Dworetzky, 819 E. First North, Apt. No. 2, Logan, Utah 84321

[22] Filed: Apr. 10, 1974

[21] Appl. No.: 459,479

[52] U.S. Cl. ................. 35/8 R; 35/48 R; 179/2 AS; 340/332
[51] Int. Cl.² .......................................... G09B 5/00
[58] Field of Search .............. 35/8 R, 9 R, 9 A, 9 B, 35/5, 6, 22 R, 48 R, 48 B; 179/2 AS, 1 B; 235/52; 273/1 E; 340/332

[56] References Cited
UNITED STATES PATENTS

| | | | |
|---|---|---|---|
| 2,712,976 | 7/1955 | Blaustein et al. | 235/52 X |
| 3,119,558 | 1/1964 | Kinross | 235/52 X |
| 3,190,014 | 6/1965 | Rhodes | 35/48 R |
| 3,318,517 | 5/1967 | Wells | 235/52 |
| 3,716,929 | 2/1973 | Barrabas | 35/48 R |
| 3,744,712 | 7/1973 | Papadopoulos et al. | 35/48 R X |
| 3,748,754 | 7/1973 | Le Berge | 35/48 R |
| 3,826,871 | 7/1974 | Kraemer | 35/9 R X |

*Primary Examiner*—Richard C. Pinkham
*Assistant Examiner*—Vance Y. Hum
*Attorney, Agent, or Firm*—Criddle & Thorpe

[57] ABSTRACT

An audience response system includes a console having a plurality of pairs of lamps in which one lamp of each pair is grouped with corresponding ones of the lamps of the other pairs. The system also includes a plurality of switches, each for controlling the lighting of a different pair of lamps, and a plurality of timers, each of which is activated by a different one of the switches. When a particular one of the lamps of a pair is lighted by the associated switch, then the corresponding timer is also activated, and when the other lamp of the pair is lighted, the corresponding timer is deactivated. An additional switch is provided to activate an additional timer and deactivate the plurality of timers.

7 Claims, 2 Drawing Figures

AUDIENCE RESPONSE SYSTEM

BACKGROUND OF THE INVENTION

This invention relates to a system in which members of an audience may communicate with an instructor, lecturer, moderator, etc., either in response to questions, to express opinions, or the like.

It is a continuing goal of educators to improve teaching effectiveness and capabilities, but in order to determine whether improvements are being realized, it is necessary that some means of evaluating teachers be provided. Various systems have been suggested for doing this with such systems typically including apparatus for enabling students to communicate responses, opinions, etc., to the teacher during the teaching process. It is felt that such "immediate feedback" operates to provide the teacher with a fairly accurate student opinion of the effectiveness, clarity, etc., of a given piece of instruction. One system for enabling such communication is described in Littauer, R. "Instructional Implication of a Low-Cost Electronic Student Response System", *Educational Technology*, October 1972, 12 (10) 69–71. As is noted in this reference, there are other commercially available student response systems but such systems often times are quite elaborate and costly.

SUMMARY OF THE INVENTION

It is an object of the present invention to provide an inexpensive simple to operate, and yet multipurpose audience response system.

It is also an object of the present invention to provide a system in which members of an audience may communicate either a favorable or unfavorable opinion, and in which a record is maintained of the time during which a given opinion is being communicated by a member.

It is also an object of the present invention, in accordance with one aspect thereof, to provide a system for registering the elapsed time during which individual members of an audience are communicating one of two possible responses, and for registering the elapsed time during which neither possible responses are being communicated.

These and other objects and advantages of the present invention are realized in a specific illustrative embodiment which includes a plurality of pairs of visual indicators in which a first indicator of each pair is grouped with all other first indicators and a second indicator of each pair is grouped with the other second indicators. Also included are a plurality of timers each corresponding to a different pair of visual indicators, and a plurality of switches, each also corresponding to a different pair of indicators to a different timer. Each switch is manually operable to activate either of the indicators of the corresponding pair and to activate the corresponding timer when a particular one of the indicators is activated.

BRIEF DESCRIPTION OF THE DRAWINGS

The above and other objects and features of the present invention will become apparent from the following detailed description presented in connection with the accompanying drawings in which.

DETAILED DESCRIPTION

Figure 1:
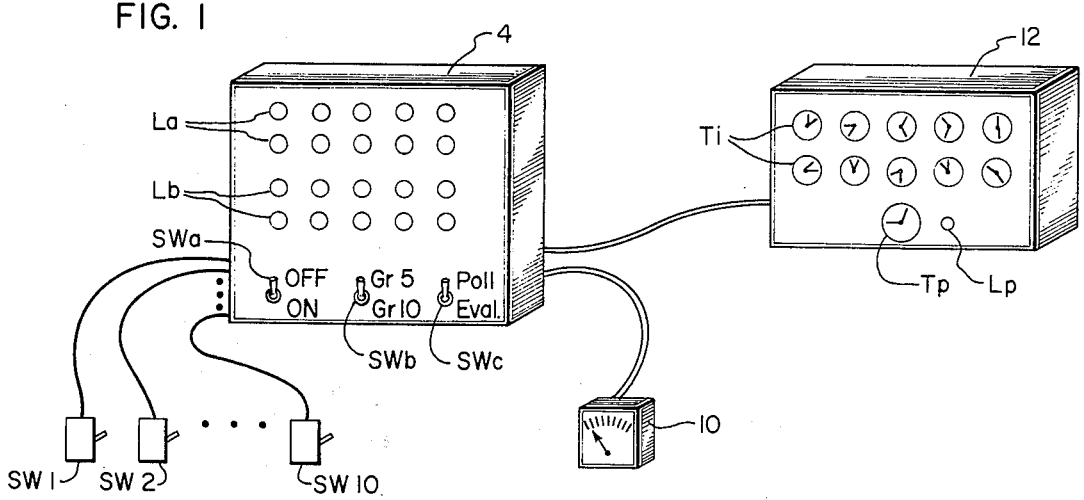
FIG. 1 shows an audience response system made in accordance with the present invention.

The audience response system shown in FIG. 1 includes a primary console 4 which has two groups of lamps $La$ and $Lb$, each group consisting of 10 lamps, and three toggle switches $SWa$, $SWb$ and $SWc$. Advantageously, the lamps in group $La$ are a different color from the lamps in group $Lb$, for reasons which will become apparent as the system is desribed. The switch $SWa$ is provided simply to turn the system on or off. The other two switches will be described later.

Ten manually operable, two-positioned switches SW 1 through SW 10 are connected to the console 4. Each of these switches is provided for controlling a corresponding pair of lamps on the console, with one lamp of each pair being located in group $La$ and the other lamp of each pair being located in group $Lb$. For example, switch SW 1 might control the upper leftmost lamp in group $La$ and the upper leftmost lamp in group $Lb$. The particular pair of lamps controlled by a given switch is unimportant and, in fact, it may be desirable to assign the switches to corresponding lamp pairs in such a manner that a user of the console is unable to correlate a given pair with a given switch (to maintain anonymity).

Each switch SW 1 through SW 10 is operable to light one of the lamps in group $La$ when the switch is in a first position and to light one of the lamps in group $Lb$ when the switch is in a second position. Thus, depending upon the setting of the switches, all the lamps in group $La$ may be lighted while none of the lamps in group $Lb$ are lighted, two of the lamps in group $La$ may be lighted while eight of the lamps in group $Lb$ are lighted, etc. The total number of lamps on the console which are lighted at a given time is equal to 10.

The console 4 is used to provide a visual indication to a teacher, moderator, etc., of responses being communicated by members of an audience using the switches SW 1 through SW 10. For example, the members of an audience having the switches may have been instructed to indicate a favorable reaction to a lecture by placing the switches in the first position and to indicate an unfavorable reaction by placing the switches in the second position. Then, during the course of the lecture or instruction, the number of lamps in group $La$ which are lighted would indicate the number of members of the audience who are favorably impressed at any given time and the number of lamps in group $Lb$ which are lighted would indicate the number who are unfavorably impressed at a given time. The utility of this type of "feedback" from an audience is that the teacher is made aware of the impression of the audience toward his instruction at all times during the instruction. Of course, the teacher could modify his presentation in response to the information communicated from the audience.

A second console of timers or clocks 12 is also coupled to the console 4. The console 12 includes an array of 10 clocks $Ti$ and an eleventh clock $Tp$. Each of the clocks $Ti$ is controlled by a different one of the switches SW 1 through SW 10. Specifically, when one of the switches is in its second position, the corresponding one of clocks $Ti$ is activated to maintain a reading of elapsed time, and when the switch is placed in the first position, the clock is deactivated or stopped. The clocks $Ti$, in effect, maintain a record of the total time in corresponding one of the switches SW 1 through SW 10 is maintained in the second position, i.e., the total time a corresponding lamp in group L$b$ is lighted.

In operation, when one of the switches SW 1 through SW 10 is placed in the second position, a corresponding one of the lamps in group L$b$ is lighted and a corresponding one of the clocks T$i$ commences to operate, and when the switch is moved to the first position, the lamp in group L$b$ is extinguished and the clock is stopped and a corresponding one of the lamps in group L$a$ is lighted.

During the course of instruction, it may be desirable to deviate from the audience evaluation of the teacher or instructor to ask particular questions of the audience. To facilitate such deviation, switch SW $c$ is provided on the console 4 so that when the switch is moved from the "evaluate" position to the "poll" position, all the clocks T$i$ are deactivated regardless of the setting of the switches SW 1 through SW 10. At the same instant the clocks T$i$ are deactivated, the clock T$p$ is activated to commence recording the elapsed time. A lamp L$p$ on the console 12 is also lighted to indicate that the evaluation phase has been interrupted and that a polling phase is now under way. After placing the switch SW$c$ in the "poll" position, questions may then be asked of the audience and members of the audience having the switches SW 1 through SW 10 can respond. The instructor or teacher, as before, is provided with a visual indication of these responses by the lamps L$a$ and L$b$. It is desirable during this polling process to deactivate the clocks T$i$ so that the reading on the clocks maintained during the evaluation phase will not be affected by the responses given during the polling operation. The clock T$p$ maintains a reading of the elapsed time during which polling operation is conducted and this time may thus be taken into account when examining, processing or evaluating the readings of clocks T$i$. At the conclusion of a polling operation, the switch SW$c$ is moved back to the evaluation position and evaluation phase may continue.

A meter 10 is coupled into the console 4 to provide an indication of the proportion or percentage of the total lamps in group L$b$ (or alternatively group L$a$) which are lighted at any given instant of time. The meter 10 could be provided for use by the teacher or for use by an observer. In any case, if all lamps of group L$b$ were lighted, the meter 10 would indicate that a 100 percent of the lamps were lighted and if five of the lamps in group L$b$ were lighted, the meter 10 would indicate that 50 percent of the lamps were lighted, etc. The meter 10 might illustratively be a simple ammeter coupled into the system as more particularly shown in FIG. 2.

The switch SW$b$ on the console 4 is provided to enable the system user to disengage or decouple from the system switches SW 6 through SW 10 and also to bias the meter 10 to "disregard" the decoupled switches so that the meter will read 100 percent when all five of the switches SW 1 through SW 5 are in the second position causing the corresponding lamps in group L$b$ to be lighted. This is desirable since the system user may wish to have a smaller sampling, i.e., only five members of the audience, for a particular phase of instruction. With the switch SW$b$ placed in the "Gr 10" position, all 10 of the switches SW 1 through the SW 10 are coupled into the system and with the switch placed in the "Gr 5" position, only switches SW 1 through SW 5 are coupled into the system. It should be understood that the system could be designed so that any number of switches greater or less than five could be decoupled when the switch SW$b$ is properly positioned, or that a three, four, etc., position switch could be provided for selectively decoupling a certain number of switches, then a larger number of switches, etc.

Figure 2:
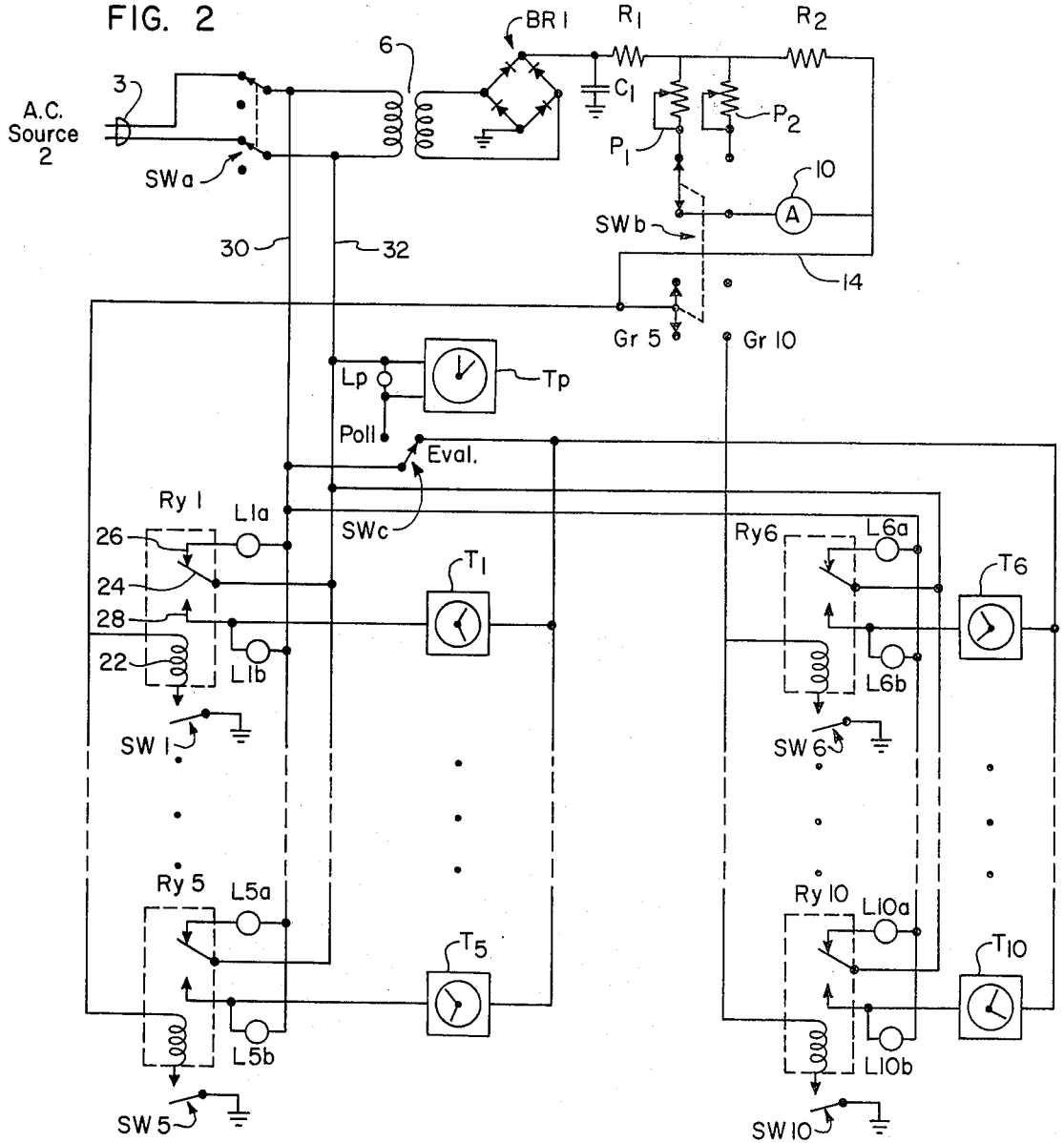
FIG. 2 shows an illustrative schematic circuit diagram of the system of FIG. 1.

FIG. 2 shows a schematic circuit diagram of the system of FIG. 1. The circuit includes a plug 3 for plugging into a source of A.C. power 2, and a double pole, double throw switch SW$a$ for connecting or disconnecting the rest of the circuit to or from the A.C. source. The circuit also includes a step-down voltage transformer 6, the primary winding of which is coupled to the switch SW$a$ and the secondary winding of which is coupled to a full-wave diode bridge rectifier BR 1. The bridge BR 1 supplies rectified current to a filter composed of a capaciter C1 and a resistor R1. The current is then supplied via a resistor R2 to a line 14 and, depending upon the setting of a switch SW$b$, to either one of two potentiometers P1 or P2. The switch SW$b$ is a two pole, two position switch and corresponds to the switch SW$b$ on the console 4 of FIG. 1. When the switch SW$b$ is in the GR 5 position (leftmost position), current flows through the potentiometer P1 and through the switch to an ammeter 10 and then to the line 14. When the switch SW$b$ is in the Gr 10 position (rightmost position), current flows through the potentiometer P2 and through the switch to the ammeter 10 and then to the line 14.

The current applied to line 14 is applied to relay R$y$ 1 through R$y$ 5 regardless of the setting of switch SW$b$; but only if the switch SW$b$ is in the Gr 10 position will current on line 14 be applied to relays R$y$ 6 through R$y$ 10. In other words, when the switch SW$b$ is in Gr 5 position, current on line 14 is supplied to relays R$y$ 1 through R$y$ 5 and thus to switches SW 1 through SW 5, but current is not supplied to relays R$y$ 6 through R$y$ 10 or to switches SW 6 through SW 10. In this manner, five of the manually operable switches may be decoupled from the system as previously described.

Each relay R$y$ and corresponding switch SW control the lighting of a pair of lamps L and the operation of a timer T. For example, relay R$y$ 1 and switch SW 1 control the lighting of lamp L1$a$ and lamp L1$b$ and the operation of timer T1. The lamp L1$a$ is located in the lamp group L$a$ on the console 4 (FIG. 1) while the lamp L1$b$ is located in the lamp group L$b$ of the console.

Each of the relays is a single pole, double throw relay whose operation is controlled by a corresponding switch. Referring to relay R$y$ 1 and switch SW 1 of FIG. 2, when the switch SW 1 is closed on relay coil 22, the coil is energized by current via line 14 to cause a movable contact or pole 24 to break with stationary contact 26 and make with stationary contact 28. When this occurs, the lamp L1$a$ is extinguished and the lamp L1$b$ is lighted by way of conductors 30 and 32 which are coupled through the switch SW$a$ to the A.C. source 2. Also, the timer T1 is activated by way of the conductors 30 and 32 through a switch SW$c$. When the switch SW 1 is "opened", the moveable contact 24 breaks with stationary contact 28 and makes with stationary contact 26 to extinguish the lamp L1$b$ and again light the lamp L1$a$. Current to the timer T1 is also terminated so the timer is turned off or deactivated.

The switch SW$c$, as previously described, is provided for deactivating all of the timers T1 through T10 and for activating another timer T$p$. This is done by moving the movable contact of the switch from the evaluate position to the poll position. When this is done, timers T1 through T10 are electrically disconnected from the conductors 30 and 32 and the timer T$p$ is electrically connected to those conductors. Also, a lamp L$p$ is coupled to the conductors 30 and 32 causing the lamp to light. The timer T$p$ thus maintains a reading of the elapsed time during which the switch SW$c$ is maintained in the poll position.

The ammeter 10 provides a reading of the amount of current flowing therethrough to the different switches SW 1 through SW 10. Of course, if none of the switches are closed, then no current flows through the ammeter and the reading would be zero. When the switch SW$b$ is in position Gr 5, the potentiometer P1 biases the ammeter 10 so that it will read from 0, when none of the switches SW 1 through SW 5 are closed, to a full scale reading, when all of the switches SW 1 through SW 5 are closed. When some number of switches less than all are closed, the ammeter 10 will maintain a reding representing the percentage of the switches which are closed. When the switch SW$b$ in position Gr 10, the potentiometer P2 biases the ammeter so that it will read from 0, when none of the switches SW 1 through SW 10 are closed, to a full scale reading when all of the switches SW 1 through SW 10 are closed. Again, when any number of switches between 0 and 10 are closed, the ammeter 10 will maintain a reading representing the percentage of such switches which are closed. In other words, regardless of the setting of the switch SW$b$, the ammeter 10 is biased to provide a full scale reading representing a percentage of all switches to which the ammeter is connected (either five or ten) which are closed.

Although a specific illustrative embodiment of the circuitry for implementing the FIG. 1 system has been described, it should be understood that there may be a variety of ways for implementing the system. The Audience Response System described provides an inexpensive and yet effective arrangement for providing an instructor or teacher with information communicated from members of an audience.

It is to be understood that the above-described arrangement is only illustrative of the application of the principles of the present invention. Numerous other modifications and alternative arrangements may be devised by those skilled in the art without departing from the spirit and scope of the invention and the appended claims are intended to cover such modifications and arrangements.

What is claimed is:

1. An audience response system comprising
first and second groups of visual indicators, each indicator in one group being paired with an indicator in the other group,
a plurality of switches, each for distribution to and use by a different member of an audience and each corresponding to a different pair of said indicators and having first and second positions, said switches each being manually operable to activate one indicator of a corresponding pair while in the first position and to activate the other indicator of the pair while in the second position,
a plurality of timers, each coupled to a different one of said switches for activation while the corresponding switch is in the first position to thereby indicate the duration that the corresponding switch is in the first position,
an additional timer, and
an additional switch coupled to said additional timer and said plurality of timers for deactivating the plurality of timers and activating the additional timer when the additional switch is in a first position, and for deactivating the additional timer when the additional switch is in a second position.

2. A system in claim 1 wherein the visual indicators are lamps and wherein the lamps in the first group are of one color and the lamps in the second group are of a different color.

3. A system as in claim 1 further comprising an additional visual indicator which is activated while said additional switch is in the first position.

4. A system as in claim 1 further comprising a meter for registering, at any given time, an indication of the percentage of said plurality of switches which are in the first position at that time.

5. A system as in claim 4 further comprising a selection switch for coupling said meter to selected ones of said plurality of switches, and means for biasing said meter to register an indication of the precentage of switches, of the total of those coupled to the meter, which are in the first position.

6. An audience response system comprising
a plurality of pairs of visual indicators, a first indicator of each pair grouped with the other indicators and a second indicator of each pair grouped with the other second indicators, said first group of indicators being spatially separated from said second group of indicators
a plurality of manually operable two-position switches for distribution to and use by members of an audience, each switch coupled to a different pair of indicators for selectively activating the first indicator of the pair when the switch is operated to a first position and for activating the second indicator of the pair when the switch is operated to a second position,
means for providing, at any given time, an indication of the proportion of said plurality of switches which are at that time activating the corresponding said particular indicators,
a selection switch coupling said indication providing means to selected ones of said plurality of switches, and
means for biasing said indication providing means to indicate the proportion of switches, of those coupled to the indication providing means, which are activating the corresponding said particular indicators.

7. A system as in claim 6 further comprising
a plurality of timers, each coupled to a switch for activation when the switch is in the first position to thereby register the time during which the switch is in the first position,
an additional timer, and
an additional switch operable to a first position to activate said additional timer and deactivate said plurality of timers to thereby register the time during which said plurality of timers are deactivated, and operable to a second position to deactivate said additional timer and activate the ones of said plurality of timers whose corresponding switches of said plurality of switches are in the first position.

* * * * *